United States Patent [19]

Rocca et al.

[11] Patent Number: 5,601,504

[45] Date of Patent: Feb. 11, 1997

[54] PROTECTION DEVICE FOR PULLEY BEARINGS

[75] Inventors: Carlo E. Rocca, Torino; Mark P. Foley, Beinasco, both of Italy

[73] Assignee: Dayco Europe S.p.A., Airasca, Italy

[21] Appl. No.: 506,769

[22] Filed: Jul. 26, 1995

[30] Foreign Application Priority Data

Jul. 28, 1994 [IT] Italy .................... MI94A1629

[51] Int. Cl.$^6$ .................................... F16H 57/04
[52] U.S. Cl. ................................ 474/91; 474/144
[58] Field of Search ............... 474/91, 144, 273, 474/903

[56] References Cited

U.S. PATENT DOCUMENTS

| | | | |
|---|---|---|---|
| 1,087,836 | 2/1914 | Schoepke | 474/144 X |
| 1,089,971 | 3/1914 | Schoepke | 474/144 X |
| 3,950,046 | 4/1976 | Lubbersmeyer | 308/190 |
| 4,054,335 | 10/1977 | Timmer | 308/191 |
| 4,551,120 | 11/1985 | Thomey | 474/135 |
| 4,698,049 | 10/1986 | Bytzek et al. | 474/135 |
| 4,793,457 | 12/1988 | Siewert et al. | 474/144 X |
| 5,275,577 | 1/1994 | Hildebrandt et al. | 474/903 X |

FOREIGN PATENT DOCUMENTS

| | | |
|---|---|---|
| 0045097 | 2/1982 | European Pat. Off. . |
| 2242596 | 3/1975 | France . |
| 2274461 | 1/1976 | France . |
| 8510144 | 7/1985 | Germany . |
| 9307931 | 7/1993 | Germany . |
| 2258287 | 2/1993 | United Kingdom . |

Primary Examiner—Roger J. Schoeppel
Attorney, Agent, or Firm—Watson Cole Stevens Davis, P.L.L.C.

[57] ABSTRACT

A device for protecting bearings of idle pulleys in belt drives includes a cover 22 having a circumferential connecting portion 23 operatively engageable with a terminal edge 13a of a fastening collar 13 positioned on the pulley and housing the bearing 18 inside. Elastic tongues 26 projecting from the cover 22 are provided at their ends with corresponding hooking teeth 24 able to engage into corresponding through engaging openings 25 in a disc-shaped flange 14, which interconnects the fastening collar 13 with a cylindrical rolling portion 13 of the pulley. The tongues 26 are elastically deformable by virtue of centrifugal force so that the interference between the hooking teeth 24 and the interconnecting flange 14 is increased by increasing the rotation speed of the pulley 2.

11 Claims, 2 Drawing Sheets 5,601,504

PROTECTION DEVICE FOR PULLEY BEARINGS

BACKGROUND OF THE INVENTION

The present invention concerns a device for protecting bearings of pulleys in belt drives from entry of dust and foreign matter. The a bearing with which the invention would typically be used has a fixed inner ring, rigidly fitted around a supporting core, and a rotating outer ring, anchored in an engagement housing provide within a pulley. The pulley has a fastening collar in which there is said engagement housing. A connecting disc-shaped flange extends coaxially around the fastening collar substantially in a plane perpendicular to the axis of the collar. The bearing has a cylindrical rolling portion circumscribing coaxially the fastening collar and the disc-shaped flange with an outer working area arranged to act in contact relation with a driving belt.

In particular, the device of the present invention is intended to be used on belt drives of the type mounted on motor vehicle engines and the like.

As known, in motor vehicle engines and the like, the actuating of components such as the a.c. generator and the cooling pump, the pump of the power steering, the compressor of the air conditioner and others, is provided by a driving belt extending in a closed loop around a driving pulley, driven by the engine itself, as well as around different driven pulleys arranged for rotating the above said components. Moreover, in a lot of cases there are provided one or more idle pulleys, used as simple slide guide pulleys and/or associated to known belt tensioners to give a constant tensioning to the belt itself, to assure a uniform transmission of motion in absence of slipping actions.

These idle pulleys usually are mounted on respective supporting pivots with the interposition of ball or roller bearings. More particularly, each bearing has its own fixed inner ring, rigidly fitted around a supporting core carried by the stationary structure of the engine or by a movable arm which may be part of the belt tensioner as well as a rotating outer ring, anchored in an engagement housing within a fastening collar making it part of the pulley. A disc-shaped flange radially projects from the fastening collar of substantially cylindrical shape, said disc-shaped flange supporting, in a radially outer position, a cylindrical rolling portion which circumscribes coaxially the fastening collar and has an outer working area arranged to act in contacts relation with the driving belt.

In consideration of the aforesaid, it is pointed out that the bearings mounted on the above said pulleys are subjected to working situations that expose them to risks of premature wearing and/or seizing owing to the great quantity of dust, deposits, welter and other foreign agents to which they are exposed.

It is clear that such a situation represents a great problem, since in consequence of the bearing seizing, the driving belt breaks owing to the strong sliding of the same on the locked pulley.

The attempts made up to now to overcome said type of problem are potentially directed to use protecting elements secured to the supporting central core of the bearing in order to protect this latter from the contact with the above mentioned foreign agents.

PRIOR ART

By way of example, reference is made to U.S. Pat. Nos. 4,551,120 and 4,693,049 and of U.K. patent No. 2,258,287, the disclosures of which are hereby incorporated by reference.

However, these solutions cannot guarantee an absolute protection of the bearing since, in order to avoid mechanical interferences between the fixed protection and the pulley or the movable part of the bearing, it is necessary to provide mechanical clearances that, even when minimized as much as possible, constitute a way through which foreign agents can reach the bearing.

SUMMARY OF THE INVENTION

In the present invention, it has been found that the bearing is perfectly protected utilizing a cover engageable in a tight manner on either of the two terminal edges of the fastening collar and anchorable in a removable manner to the pulley by hooking means engaged through openings in the disc-shaped flange; it solves the technical problems deriving from the anchoring of the cover itself on the pulley rotatable part in presence of the of considerable centrifugal stresses, the inventive arrangement maintaining the possibility of easily removing the cover itself and considerably containing the costs thereof.

More particularly, the invention concerns a device for protecting bearings of pulleys in belt drives comprising: a cover having a circumferential connecting portion shaped to and able to operatively engage with a terminal edge of said fastening collar; hooking means operatively connected with the cover, able to get into corresponding engaging through openings in said disc-shaped flange and arranged to act in abutting relationship on the disc-shaped flange itself, on the opposite side with respect to the cover, to fix the cover in a removable manner to said pulley; interconnecting elastic means operating between the hooking means and the cover to be clicked into the hooking means on the radially outer edge of said engaging openings.

Moreover it is provided that the said elastic means are also elastically deformable as a result of centrifugal force, so that the interference and security of the engagement between the hooking means and the radially outer edges of said openings tends to increase by increasing the rotation speed of the pulley.

Advantageously, said hooking means comprises a plurality of hooking teeth circumferentially arranged around the periphery of the cover and each having a substantially wedge-shaped profile defined by an inclined guide surface directed in the opposite direction with respect to the cover and arranged to interfere with the radially outer edge of the corresponding engaging opening and from which a stop surface projects; said stop surface being turned towards the cover and oriented in a substantially radial direction with respect to the axis of the cover to act in abutment relationship against the disc-shaped flange, on the opposite part with respect to the cover, said guide and stop surfaces meeting at an apex spaced from the axis of the cover at a distance greater than the radial distance of the outer edge of said engaging opening with respect to the axis of the pulley.

Preferably, the elastic means comprise in turn a plurality of elastic tongues projecting from said cover and each supporting at their ends one of said hooking teeth.

Preferably, there are also provided centering means associated to said cover to guide it coaxially to the fastening collar during the engagement of the cover itself with the pulley.

Advantageously, said centering means comprise circumferentially distributed pins, projecting from the cover and arranged to slidingly act in opposition relation, on the outer cylindrical surface of the fastening collar.

According to particular requirements, it is possible to provide at least two hooking teeth and at least two elastic tongues placed in diametrically opposite positions with respect to the axis of the cover and able to operatively fit into corresponding through engaging openings, or at least three hooking teeth and at least three corresponding closing tongues, distributed angularly at 120 degrees with respect to the axis of said cover.

In greater detail, in a preferred embodiment the device forming the object of the present invention comprises four hooking teeth and four corresponding closing tongues, distributed according to an angular pitch of 90 degrees with respect to the axis of the cover and arranged to fit into corresponding through engaging openings.

BRIEF DESCRIPTION OF THE DRAWINGS

Further features and advantages will better appear from the detailed description of some preferred, but not exclusive, embodiments, of a device for protecting bearings of pulleys in belt drives according to the present invention. Said description will be made hereinafter with reference to the attached sheets of drawing, supplied by way of non-limiting example, wherein.

DETAILED DESCRIPTION OF A PREFERRED EMBODIMENT

Figure 2:
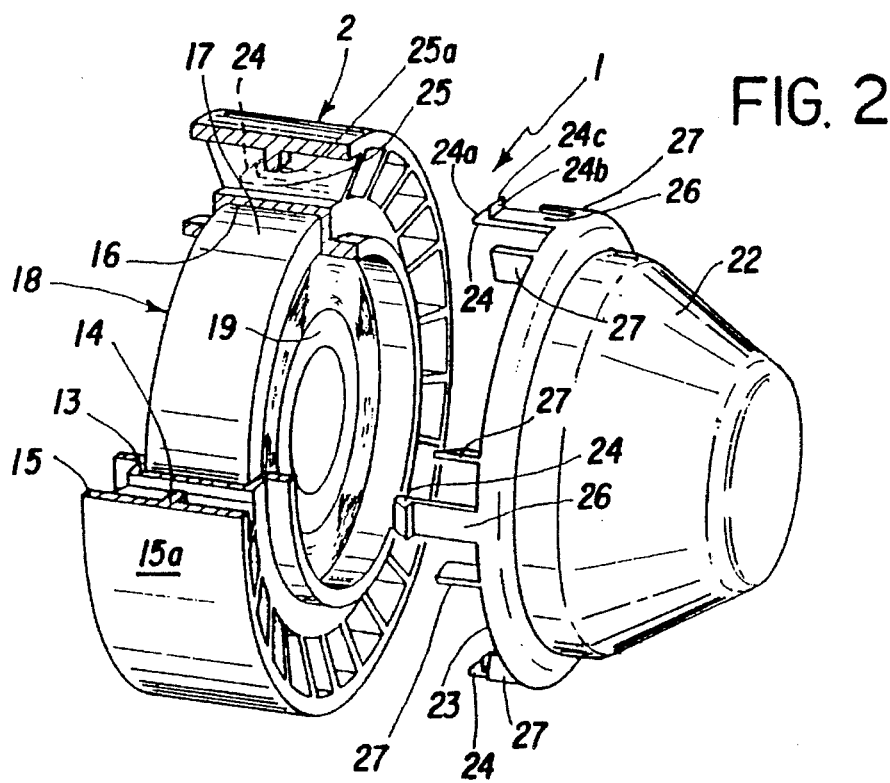
FIG. 2 is an exploded perspective view of a pulley provided with the device for protecting the bearing according to the present invention.
Figure 4:
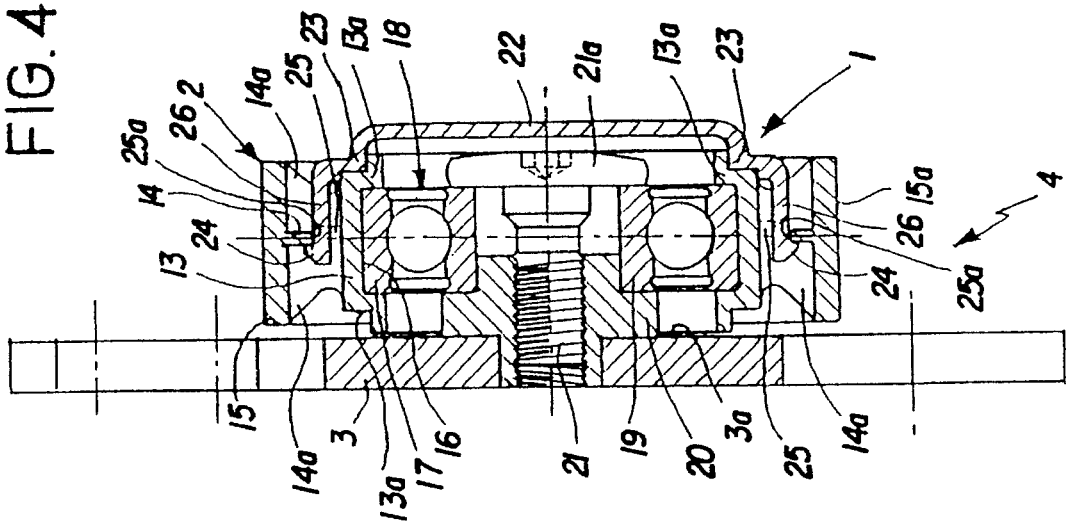
FIG. 4 is a sectional view of the pulley of FIG. 3.

With reference to the drawing figures, and in particular to FIGS. 2 and 4, reference numeral 1 indicates a device for protecting bearings of pulleys in belt drives, taken as a whole, according to the present invention.

Figure 1:
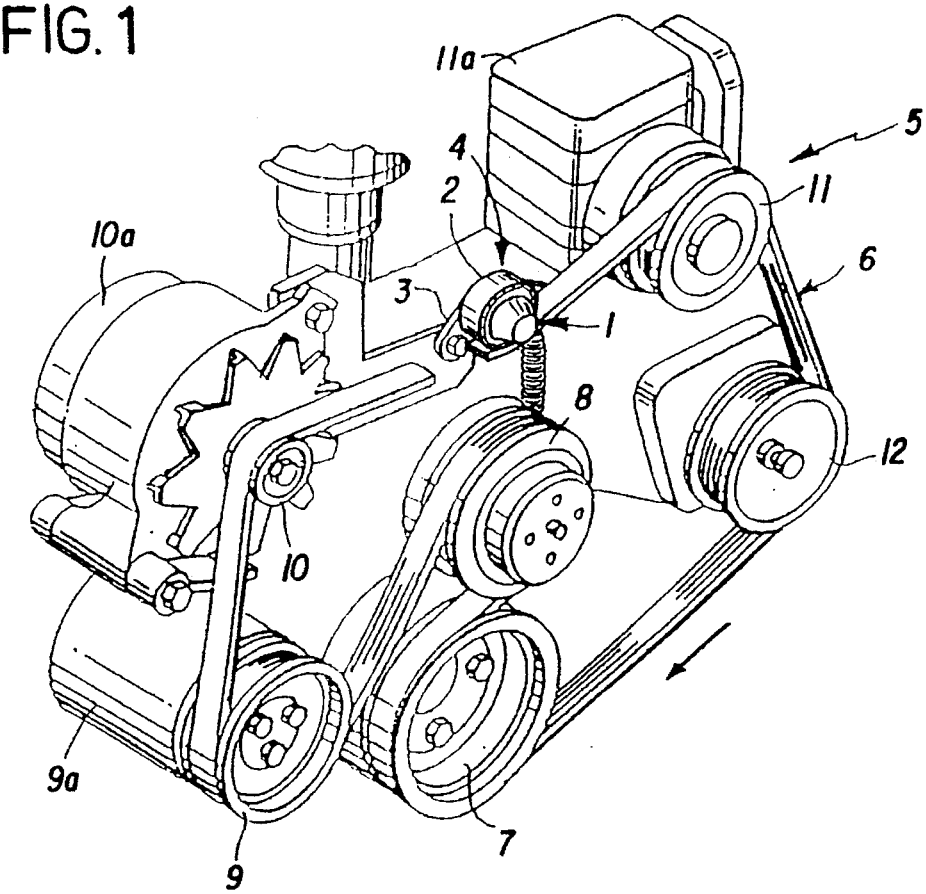
FIG. 1 shows schematically a partial perspective view of a belt drive associated with a motor vehicle engine and provided with a tensioner to assure a correct tensioning action of the belt.

In the example referred to in FIG. 1, the device 1 is associated with an idle pulley 2, operatively connected to a movable arm 3 which is part of a conventional belt tensioner 4, associated in turn with a belt drive of a motor vehicle engine indicated as a whole with reference numeral 5 in FIG. 1. The tensioner is used in order to assure a correct tensioning action on a driving belt 6.

In the example of FIG. 1 the driving belt 6, moved by a driving pulley 7, rotated by the engine, in turn rotates a first, second, third, fourth and fifth driven pulley 8, 9, 10, 11 and 12, respectively associated with a cooling pump (not shown), an air pump 9a, an alternator 10a, a compressor 11a for the cooling circuit of an air conditioner, as well as to a hydraulic pump of a power steering unit (not shown).

The pulley 2 is of the type made of an injection molded plastic material and has conventionally a fastening collar 13 of a substantially cylindrical configuration, a connecting disc-shaped flange 14 extending coaxially around the fastening collar 13 and lying substantially in a plane perpendicular to the axis of rotation of the pulley. A cylindrical rolling portion 15 coaxially circumscribes the fastening collar 13 and the connecting flange 14. An outer working area 15a is on the outer surface of the cylindrical rolling portion 15, said outer working area 15a being arranged to act in contact relationship on the driving belt 6, between the third and the fourth driven pulleys 10 and 11.

Radial ribs 14a are equally angularly spaced between the fastening collar 13 and the cylindrical rolling portion 15.

Inside the fastening collar 13 there is an engagement housing 16 in which an outer ring 17 is fixed, said outer ring 17 being part of a common ball bearing 18 whose inner ring 19 is coaxially fitted around a supporting core 20 projecting from said arm 3.

More particularly, the fixing of the outer ring 17 in the engagement housing 16 can be obtained, for example, by forcing the bearing 18 into the fastening collar 13, or by forming the pulley 2 directly around the outer ring itself after having placed the bearing 18 inside the injection mould utilized for making the pulley 2.

The inner ring 19, in turn, is fixed on the supporting core 20 by an interference fit and/or with the aid of an axial blocking threaded device 21 (FIG. 4).

The device 1 according to the present invention is to protect the bearing 18 from contact with dust, sand, particles, water and any other substance that can cause a premature wearing and/or impair its functionality.

Figure 3:
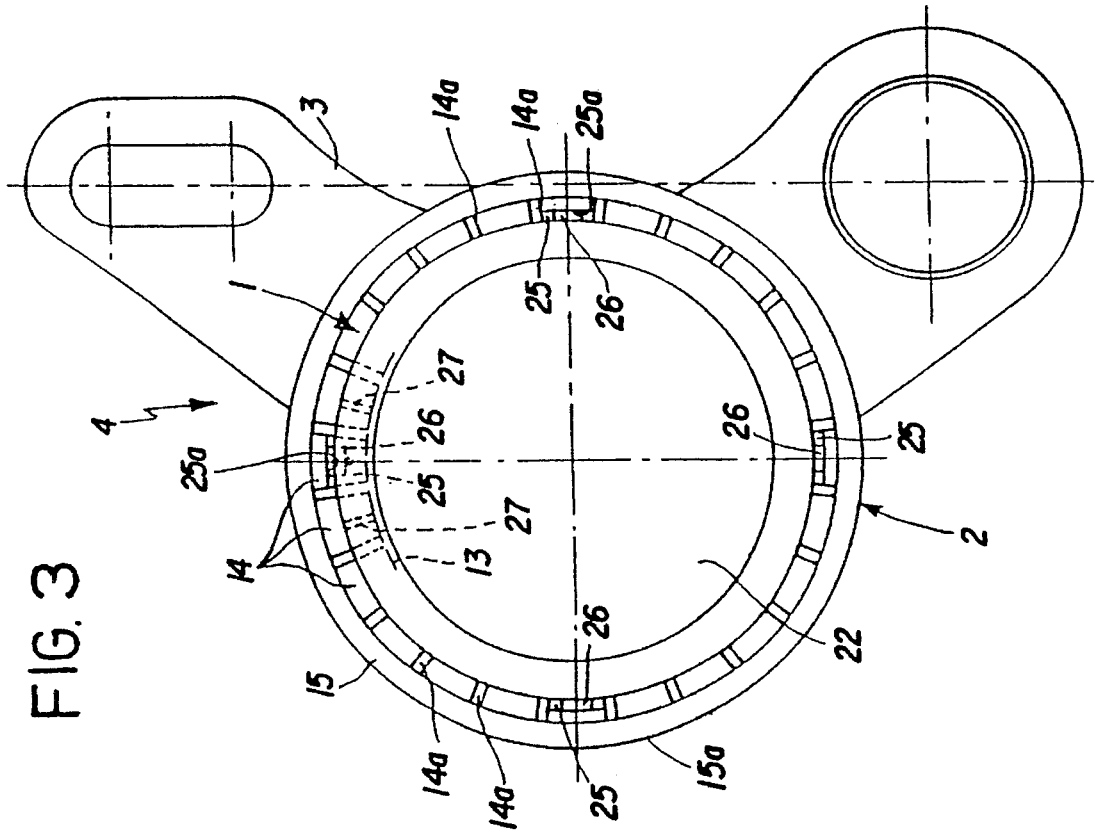
FIG. 3 is a lateral view of a pulley provided with the protecting device forming the object of the present invention.

To this end, the device 1 comprises at least a cover 22 placed coaxially against one side of the pulley 2, as clearly visible in FIGS. 2 and 3.

The cover 22 has a circumferential connecting portion 23 shaped to be operatively engageable with one of the terminal edges 13a (FIG. 4) of the fastening collar 13.

As can be easily seen from FIG. 4, the engagement between the circumferential connecting portion 23 of the cover 22 and the corresponding terminal edge 13a of the fastening collar 13 takes place substantially in a hermetic seal relationship, so that, on the side of the pulley 2 supporting the cover itself, the bearing 18 is completely protected from contamination.

In the represented example, on the side of the pulley 2 opposite to the cover 22, the protection of the bearing 18 from the contact with particles and impurities is afforded, in a way known per se, by a flat screening surface 3a defined on the movable arm 3, or on another fixed structure bearing the supporting core 20, extending close to the terminal edge 13a opposite to that mounting the cover 22.

Alternatively, it is possible to arrange two covers 22, one on each side of the pulley 2.

Of course, the cover 22 may have many different shapes depending on the requirements. By way of example, in the embodiment shown in FIG. 4, where the threaded device 21 has a flattened head 21a, the shape of the cover is substantially flat. On the other hand, in the example of FIGS. 1 and 2, the cover 22 has a cupola-like shape and is fitted to house threaded elements having larger axial overall dimensions.

In the present invention, the engagement of the cover 22 with the pulley 2 may be obtained through hooking means 24 operatively connected to the cover itself and able to be inserted into corresponding through engaging openings 25 in the disc-shaped flange 14, as it will better appear hereinafter.

Interconnecting elastic means 26 operate between the hooking means 24 and the cover 22. Preferably, said elastic means 26 are constituted by elastic tongues extending in a projecting manner from the cover itself and enabling the hooking means to be inserted with a snapping action into the through openings 25 on the radially outer edges 25a.

More particularly, the above said hooking means comprise a plurality of hooking teeth 24 circumferentially distributed around the axis of the cover 22, each carrying one of the elastic tongues 26 at the end thereof. As clearly visible in FIG. 2, each hooking tooth 24 has a radially outward facing substantially wedge-shaped profile, defined by an inclined guide surface 24a, directed outwardly with respect to the cover 22, to which a stop surface 24b is associated; said stop surface 24b extends radially outward from the cover itself and is oriented in a substantially radial direction with respect to the axis of the cover. The guide surface 24a and the stop surface 24b meet at an apex 24c spaced from the axis of the cover 22 at a slightly greater distance than the radial distance of the outer edge 25a of the corresponding engaging opening 25 with respect to the axis of the pulley 2.

In this way, the application of the cover 22 requires only that it be coaxially pushed against the pulley 2 on the side thereof where the cover itself will be engaged. In fact, in such a situation the hooking teeth 24 at the beginning will interfere with the radially outer edges 25a of the engaging openings 25 through the respective inclined guide surfaces 24a. In consequence of said interference, the hooking teeth 24 will be pushed radially toward the axis of the cover 22, upon the elastic deformation of the tongues 26, as long as the apices 24c will have passed completely over the radially outer edges 25a of the corresponding engaging openings 25. At this point, the elastic action of the tongues 26 will make the hooking teeth 24 click radially towards the outside, so that the stop surfaces 24b will act in abutment relationship against the disc-shaped flange 14, on the side opposite to the cover 22, to hold the cover axially against the side of the pulley 2.

In this situation, the cover 22 will be with its circumferential connecting portion 23 in engagement relationship with the corresponding terminal edge 13a of the fastening collar 13, assuring the optimal protection of the bearing 18 from contact with the impurities coming from outside.

Advantageously, when the pulley 2 rotates at high speed in consequence of the pulling by the belt 6, the effect of the centrifugal force on the hooking teeth 24 is such that, thanks to the elastic deformability of the tongues 26, the interference between the teeth and the outer edges 25a of the openings 25 tends to be increased, thus the securement is greater as the rotation speed is higher.

In other words, the effect of centrifugal force is a bar to the movement of the teeth 24 towards the axis of the pulley 2 and the cover 22 and the attachment of the teeth is greater as the rotation speed increases.

This situation represents an optimal security, since it eliminates any risk of an accidental release of the cover 22 as a consequence of the rotation.

When the pulley is not working, it will be sufficient to act on one or more of the elastic tongues 22 with the point of a screwdriver or other suitable tool to obtain the release of the hooking teeth 24 from the disc-shaped flange 14 and the consequent removal of the cover 22 in case of necessity, for instance to allow the access to the bearing 18 for maintenance operations and/or to remote the pulley 2.

In a preferred embodiment, the cover 22 also has centering means, constituted for insurance by circumferentially distributed centering pins 27, extending in a projecting manner from the protection cover and arranged to act in opposition relation on the outer cylindrical surface of the fastening collar 13 so that, during the assembly, the cover is suitably guided coaxially to the fastening collar. This achieves a further simplification of the operations of application of the cover 22 on the pulley 2, as well as the elimination of any possibility to insert the teeth 24 in an incorrect position, with the consequent risk of damaging the teeth themselves and/or the elastic tongues 26.

In the shown example, it is provided that two of said centering pins 27 be placed alongside each elastic tongue 26, symmetrically on opposite sides.

Of course, also the number of hooking teeth 24 and elastic tongues 26, as well as the corresponding openings 25, can be varied depending on the requirements. In the shown example, there are arranged four hooking teeth 24 and elastic tongues 26 distributed at an angular pitch of 90 degrees, arranged to go into the four corresponding engaging openings 25. Alternatively, it could be possible to use only two hooking teeth 24 and corresponding elastic tongues 26, arranged in positions diametrically opposite with respect to the axis of the cover 22 or, preferably, at least three hooking teeth 24 and corresponding elastic tongues 26, arranged angularly at 120 degrees with respect to the axis of the cover.

Thus the invention achieves important advantages.

As clearly results from what has been previously described, the protection device forming the object of the present invention is an optimal protection for the bearing without leaving, on the side of the pulley 2 supporting the cover 22 any space that can constitute an access way for the impurities towards the bearing.

Also it is noted that the perfect closing made by the cover 22 on the terminal edge 13a of the fastening collar 13 enables the cover itself to be an efficacious means to contain the noise transmitted by the bearing 18 towards outside, in consequence of the rolling action at high speed.

Thanks to the arrangement of the through openings 25 across the disc-shaped flange 14, the device forming the object of the present invention permits one to apply the cover to either or both sides of the pulley, without requiring any additional elements and/or structural modifications of the same.

Moreover the protection cover can be easily removed from the pulley in case of need but without the removal easiness producing risks of accidental disengagement by the cover during the rotation at high speed. In fact, as it has been seen, the effects of the centrifugal force assure a greater stability of the connection.

Moreover, it is pointed out that the device forming the object of the present invention achieves all the above mentioned advantages also maintaining a very simple and essential structure, realizable at greatly contained costs.

Of course, the invention as herein disclosed may include numerous amendments and alternative embodiments, all deriving from the inventive principle disclosed.

We claim:

1. A device for protecting bearings of pulleys in belt drives, said belt drive having a bearing with a fixed inner ring rigidly fitted around a supporting core and a rotating outer ring which is anchored in an engagement housing provided inside a pulley, said pulley having a fastening collar in which said engagement housing is secured and a connecting disc-shaped flange extending coaxially around said fastening collar substantially in a plane perpendicular to an axis of the collar, and a rolling cylindrical portion circumscribing coaxially the fastening collar and the disc-shaped flange, said rolling cylindrical portion having an outer working area for acting in contact with a driving belt, said device comprising:

a cover having a circumferential connecting portion shaped to operatively engage with a terminal edge of said fastening collar;

hooking means operatively connected with the cover, and shaped for insertion into corresponding through engaging openings in said disc-shaped flange, so that said circumferential connecting portion is maintained in abutment relationship on the disc-shaped flange to removably fix the cover to said pulley;

interconnecting elastic means between the hooking means and the cover to snap lock the hooking means on radially outer edges of said engaging openings.

2. Device according to claim 1 in which said hooking means comprise a plurality of hooking teeth circumferentially spaced around the axis of the cover, each tooth having a substantially wedge-shaped profile defined by a forwardly facing inclined guide surface and arranged to slidingly contact the radially outer edge of the corresponding engaging opening, a stop surface on each tooth, said stop surface being directed toward the cover and oriented in a substantially radial direction with respect to the axis of the cover to act in abutment against the connecting disc-shaped flange, on an opposite side with respect to the cover itself, said inclined guide surface and said stop surface being joined at an apex spaced from the axis of the cover at a distance greater than the radial distance of the outer edge of said engaging opening with respect to the axis of the pulley.

3. Device according to claim 2, in which said elastic means comprise a plurality of elastic tongues projecting from said cover and each having one of said hooking teeth at an end thereof.

4. Device according to claim 3 including at least two hooking teeth and at least two elastic tongues which are in approximately diametrically opposite positions with respect to the axis of the cover.

5. Device according to claim 3 comprising at least three hooking teeth and at least three corresponding elastic tongues spaced angularly apart at about 120 degrees with respect to the axis of said cover.

6. Device according to claim 3 comprising four hooking teeth and four corresponding elastic tongues spaced angularly apart by about 90 degrees with respect to the axis of the cover.

7. Device according to claim 1 including centering means associated with said cover to coaxially guide the fastening collar during the engagement of the cover with the pulley.

8. Device according to claim 7 in which said centering means comprises a plurality of centering pins, circumferentially spaced on said cover, projecting from the cover and arranged to act in a sliding manner on the outer cylindrical surface of the fastening collar.

9. A pulley for belt drives, said belt drive comprising:

a fastening collar having an engagement housing for an outer ring of a rolling bearing;

a disc-shaped flange extending coaxially around said fastening collar substantially in a plane perpendicular to an axis of the collar;

a rolling cylindrical portion having an outer periphery for contacting a driving belt land coaxially circumscribing the fastening collar and the disc-shaped flange; said cylindrical portion having a plurality of through engaging openings in said disc-shaped flange, said openings being arranged to engage with respective hooking means for operatively connecting with a cover, engageable with a terminal edge of said fastening collar.

10. A cover for protecting bearings of pulleys in belt drives, said cover engaging with a pulley having a fastening collar with a housing for engagement with an outer ring of a bearing, a connecting disc-shaped flange extending coaxially around said fastening collar substantially in a plane perpendicular to an axis of said collar;

a cylindrical rolling portion circumscribing coaxially the fastening collar and the disc-shaped flange, said rolling portion having an outer working area for acting in contact relationship with a driving belt, said cover comprising:

a circumferential connecting portion shaped to operatively engage with a terminal edge of said fastening collar;

hooking means shaped for insertion into corresponding through engaging openings in said disc-shaped flange and arranged to act in abutment relationship on the disc-shaped flange, to fix the cover in a releasable manner to said pulley;

interconnecting elastic means carrying said hooking means to snap lock the hooking means on the radially outer edges of said engaging openings, said elastic means being elastically deformable by centrifugal force, so that interference between the hooking means and the radially outer edges of said openings tends to increase by increasing the rotation speed of the pulley.

11. Device for protecting bearings of pulleys in belt drives, said belt drive having a bearing with a fixed inner ring rigidly fitted around a supporting core and a rotating outer ring fitted in an engagement housing inside a pulley, said pulley having a fastening collar in which said engagement housing is positioned, a connecting disc-shaped flange extending coaxially around said fastening collar substantially in a plane perpendicular to an axis of said flange, an outer cylindrical rolling portion circumscribing coaxially the fastening collar and the disc-shaped flange and having an outer working area to act in contact relationship on a driving belt, said device comprising:

a cover having a circumferential connecting portion shaped to operatively engage with a terminal edge of said fastening collar;

hooking means operatively connected with the cover, for interfitting into corresponding through engaging openings in said disc-shaped flange and arranged to act in abutment relationship on the disc-shaped flange, to removably fix the cover to said pulley;

interconnecting elastic means between the hooking means and the cover to snap lock the hooking means on the radially outer edges of said engaging openings, said elastic means being elastically deformable as a result of centrifugal force, so that the interference between the hooking means and radially outer edges of said openings tends to increase with increasing rotation speed of the pulley.

* * * * *